(12) United States Patent
Quartaro

(10) Patent No.: US 9,849,571 B2
(45) Date of Patent: Dec. 26, 2017

(54) SPIGOT STOP REMOVAL BIT DEVICE

(71) Applicant: Jeff Quartaro, Geneva, NY (US)

(72) Inventor: Jeff Quartaro, Geneva, NY (US)

( * ) Notice: Subject to any disclaimer, the term of this patent is extended or adjusted under 35 U.S.C. 154(b) by 326 days.

(21) Appl. No.: 14/587,540

(22) Filed: Dec. 31, 2014

(65) Prior Publication Data

US 2016/0186915 A1 Jun. 30, 2016

(51) Int. Cl.
*F16L 55/48* (2006.01)
*B25B 27/02* (2006.01)
*B25B 15/00* (2006.01)
*B23B 51/00* (2006.01)

(52) U.S. Cl.
CPC .............. *B25B 27/02* (2013.01); *B23B 51/00* (2013.01); *B25B 15/007* (2013.01)

(58) Field of Classification Search
CPC ....... B25B 27/02; B25B 15/007; B23B 51/00; F16L 55/48
USPC .................................................. 81/441, 53.2
See application file for complete search history.

(56) References Cited

U.S. PATENT DOCUMENTS

| | | | | |
|---|---|---|---|---|
| 59,608 A | | 11/1866 | Hutchins | |
| 1,301,802 A | * | 4/1919 | Anderson | B25G 1/005 279/93 |
| 1,414,110 A | | 4/1922 | Bocchio | |
| 2,066,132 A | * | 12/1936 | Zihler | B25B 27/18 72/371 |
| 2,108,195 A | | 2/1938 | Crow | |
| 2,752,965 A | * | 7/1956 | Mackey | B27G 15/00 279/144 |
| 3,106,233 A | * | 10/1963 | Wolny | B25B 27/18 29/426.5 |
| 3,216,292 A | * | 11/1965 | Flegal | B25B 27/18 81/53.2 |
| 3,865,502 A | | 2/1975 | Hamann | |
| 4,076,444 A | | 2/1978 | Siebrecht | |
| 4,144,868 A | * | 3/1979 | Heitbrink | B25D 17/02 125/41 |
| 4,446,622 A | * | 5/1984 | Lamphere | B26B 17/003 30/124 |
| 4,505,341 A | | 3/1985 | Moody et al. | |
| 4,741,083 A | | 5/1988 | Wolfe | |
| 4,875,289 A | * | 10/1989 | Poling | B25D 3/00 30/167 |
| 5,184,531 A | * | 2/1993 | Wickson | B25F 1/00 7/157 |
| 5,819,385 A | | 10/1998 | Klaptchuk | |
| 5,879,112 A | | 3/1999 | Ivey | |
| 8,065,938 B1 | * | 11/2011 | Kravitch | B25B 13/48 81/177.2 |
| 2009/0321103 A1 | | 12/2009 | Griffith | |

* cited by examiner

*Primary Examiner* — Hadi Shakeri

(57) ABSTRACT

A spigot stop removal bit device facilitates removal of a buried spigot stop without having to dig. The device includes a first bit and a second bit each having a respective first end configured for coupling to a driving tool to be selectively rotated by the driving tool. A second end of the first bit is flat. A second end of the second bit is sharpened wherein the second end of the second bit is configured for engaging and cutting into the plug wherein the plug is structurally compromised to facilitate removal of remnants of the plug from the hydrant pipe. Respective lengths of the first bit and the second bit are extended such that the second end of each is configured for engaging a plug positioned in a hydrant pipe.

1 Claim, 4 Drawing Sheets

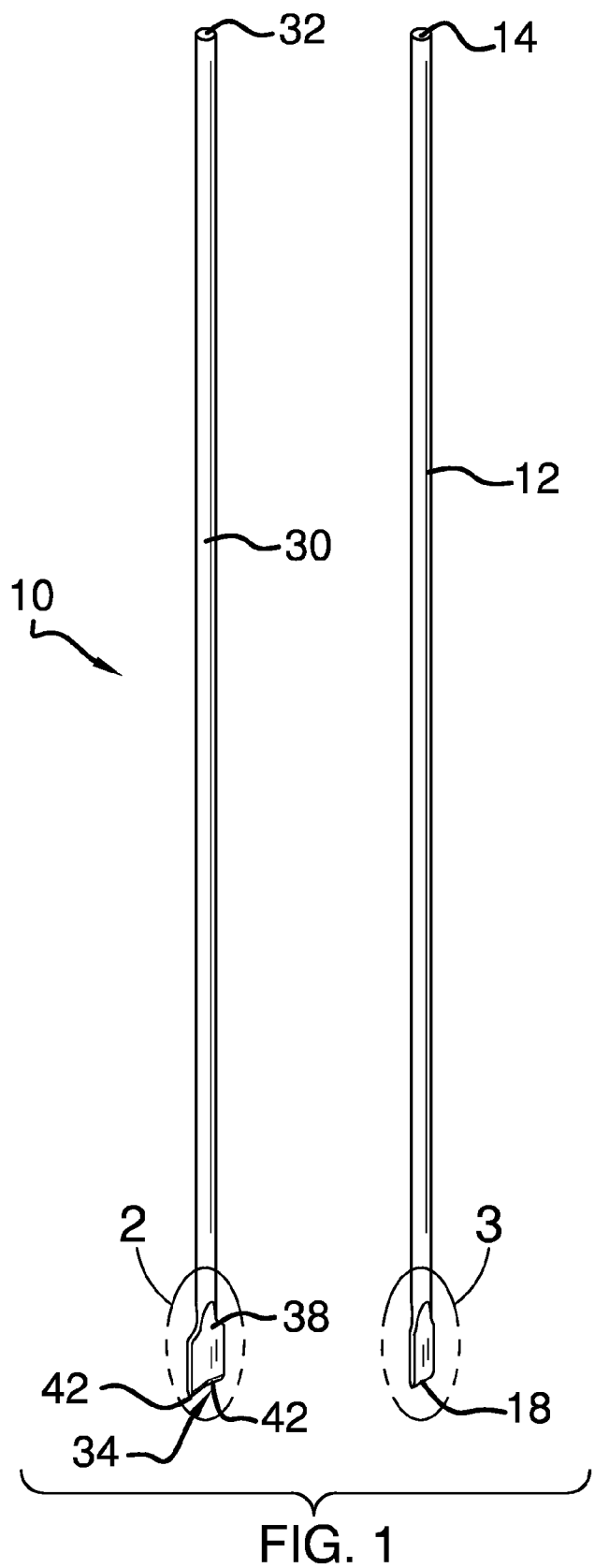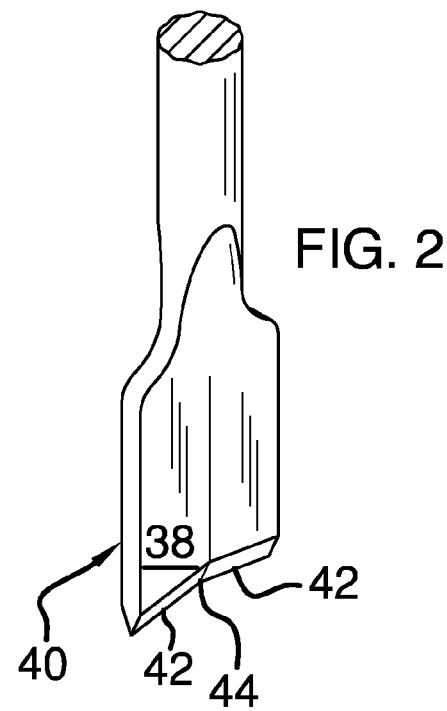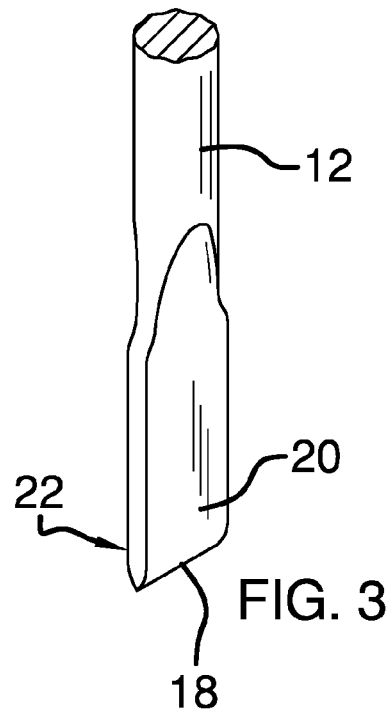

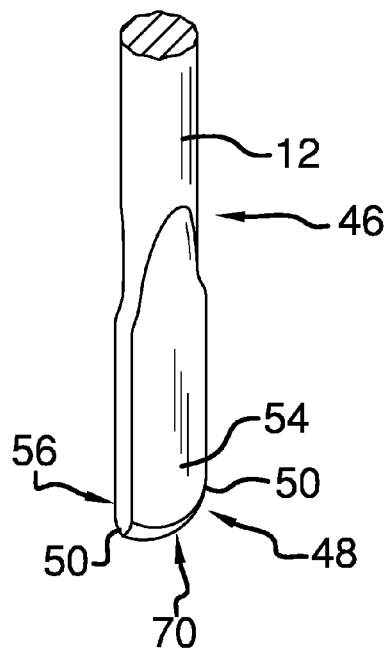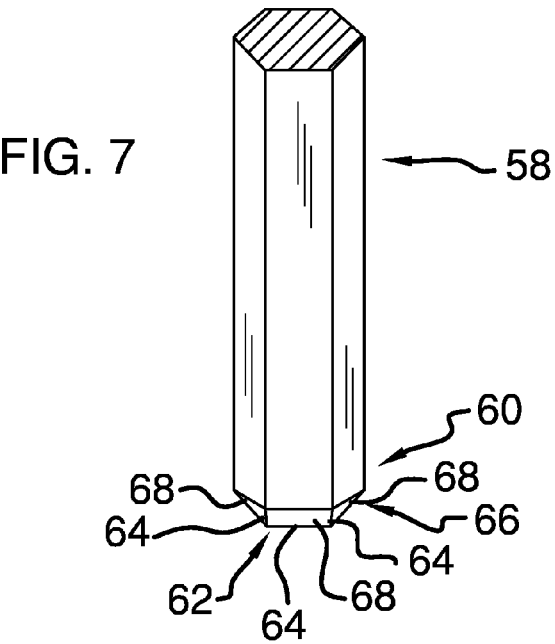

SPIGOT STOP REMOVAL BIT DEVICE

BACKGROUND OF THE DISCLOSURE

Field of the Disclosure

The disclosure relates to bit devices and more particularly pertains to a new bit device for facilitating removal of a buried spigot stop without having to dig.

SUMMARY OF THE DISCLOSURE

An embodiment of the disclosure meets the needs presented above by generally comprising a first bit and a second bit each having a respective first end configured for coupling to a driving tool to be selectively rotated by the driving tool. A second end of the first bit is flat. A second end of the second bit is sharpened wherein the second end of the second bit is configured for engaging and cutting into the plug wherein the plug is structurally compromised to facilitate removal of remnants of the plug from the hydrant pipe. Respective lengths of the first bit and the second bit are extended such that the second end of each is configured for engaging a plug positioned in a hydrant pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a spigot stop removal bit device according to an embodiment of the disclosure.

FIG. 2 is a top front side detailed view of an embodiment of the disclosure.

FIG. 3 is a top front side detailed view of an embodiment of the disclosure.

FIG. 6 is a top front side perspective view of an embodiment of the disclosure.

FIG. 7 is a top front side perspective view of an embodiment of the disclosure.

DESCRIPTION OF THE PREFERRED EMBODIMENT

Figure 4:
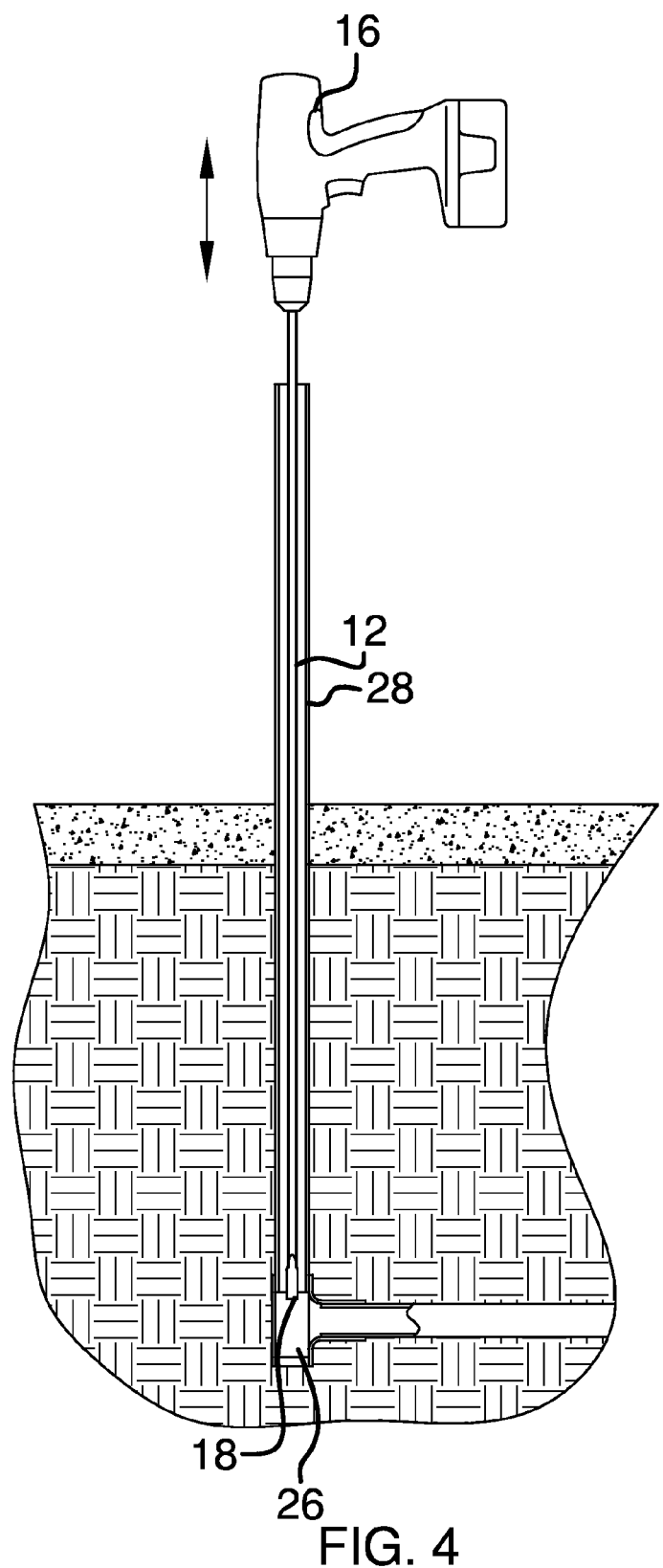
FIG. 4 is a front view of an embodiment of the disclosure in use.
Figure 5:
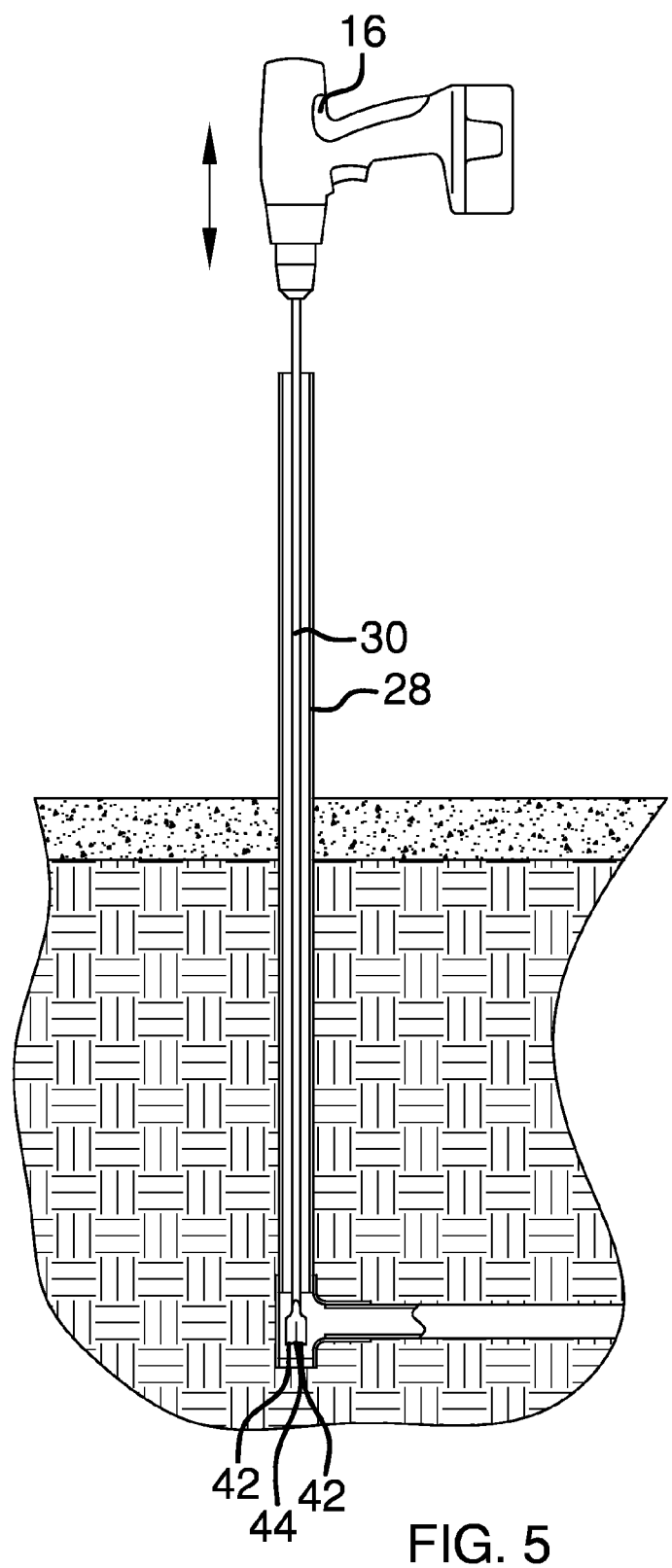
FIG. 5 is a front view of an embodiment of the disclosure in use.

With reference now to the drawings, and in particular to FIGS. 1 through 7 thereof, a new bit device embodying the principles and concepts of an embodiment of the disclosure and generally designated by the reference numeral 10 will be described.

As best illustrated in FIGS. 1 through 7, the spigot stop removal bit device 10 generally comprises a first bit 12 having a first end 14 configured for coupling to a driving tool 16 wherein the first bit 12 is selectively rotated by the driving tool 16. A second end 18 of the first bit 12 is flat extending between opposite sides of the second end 18 defining a straight edge transverse to the length of the first bit 12. The second end 18 of the first bit 12 may be tapered extending from a front face 20 of the first bit 12 and a rear face 22 of the first bit 12 towards the second end 18 of the first bit 12. Thus, the first bit 12 is similar to a conventional screwdriver type tip. A length of the first bit 12 is extended such that the second end 18 of the first bit 12 is configured for engaging a plug 26 positioned in a hydrant pipe 28 wherein rotational force is applied to the plug 26 in a selectable direction by use of the driving tool 16. Thus, the first bit 12 may be used to attempt to loosen the plug 26 or drive the plug 26 into firm engagement with the hydrant pipe 28.

A second bit 30 has a first end 32 configured for coupling to the driving tool 16 wherein the second bit 30 is selectively rotated by the driving tool 16. Unlike the second end 18 of the first bit 12, a second end 34 of the second bit 30 is sharpened wherein the second end 34 of the second bit 30 is configured for engaging and cutting into the plug 26 wherein the plug 26 is structurally compromised, i.e. destroyed to the point the plug 26 will no longer serve to block the hydrant pipe 28, Structural compromising of the plug 26 serves to facilitate removal of remnants of the plug 26 from the hydrant pipe 28 by water pressure through the hydrant pipe 28. The second end 34 of the second bit 30 is tapered extending from a front face 38 of the second bit 30 and a rear face 40 of the second bit 30 towards the second end 34 of the second bit 30. The second end 34 of the second bit 30 has a pair of straight outer sections 42. Each outer section 42 extends upwardly and inwardly to an apex 44 between the outer sections 42. The outer sections 42 may have an equal length and angling relative to a longitudinal axis of the second bit 30 such that the apex 44 is aligned with the longitudinal axis of the second bit 30. A width of the second end 34 of the second bit 30 is greater than a width of the second end 18 of the first bit 12 to facilitate destruction of the plug 26 by the second bit 30 after initial engagement of the plug 26 by the first bit 12.

FIG. 6 shows a third bit 46 being similar to the first bit 12 but having an alternative shape for the second end 18 of the first bit 12. In FIG. 6, an edge 70 at a second end 48 of the third bit 46 is rounded extending between opposite sides 50 of the second end 48 defining a curved edge 52 transverse to the length of the third bit 46. The second end 48 of the third bit 46 may be tapered extending from a front face 54 of the third bit 46 and a rear face 56 of the third bit 46 towards the second end 48 of the third bit 46. In FIG. 7, a fourth bit 58 as an alternative to the second bit 30 is shown. The fourth bit 58 is similarly shaped to the second bit 30 but for the second end 34 of the second bit 30. A second end 60 of the fourth bit 58 is formed by a planar end surface 62 transverse to a longitudinal axis of the fourth bit 58. A plurality of angled faces 64 defined a tapered section 66 positioned at the second end 60 of the fourth bit 58. Edges 68 extending between the angled faces 64 are sharpened allowing the second end 60 of the fourth bit 58 to cut into the plug 26. The length of the fourth bit 58 may be consistent along a length of the fourth bit 58 defining a hexagonal, or other polygonal, transverse cross-sectional shape.

In use, the first bit 12 is attached to the driving tool to attempt straightforward removal of the plug 26. Upon failure to remove the plug 26, the driving tool 16 is reversed and the plug 26 is driven to insure firm engagement of the plug 26 within the hydrant pipe 28. The second bit 30 is then coupled to the driving tool 16 instead of the first bit 12. The second bit 30 is then rotated by the driving tool 16 and forced into contact with the plug 26 wherein the second bit 30 essentially destroys the plug 26 such that pieces of the plug may be washed out of the hydrant pipe 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A spigot stop removal system comprising:
   a first bit having a first end being configured for coupling to a driving tool wherein said first bit is selectively rotated by the driving tool;
   a second end of said first bit being flat, said second end of said first bit being tapered extending from a front face of said first bit and a rear face of said first bit towards said second end of said first bit;
   a length of said first bit being extended such that said second end of said first bit is configured for engaging a plug positioned in a hydrant pipe wherein rotational force is applied to the plug in a selectable direction;
   a second bit having a first end being configured for coupling to a driving tool wherein said second bit is selectively rotating by the driving tool;
   a second end of said second bit being sharpened wherein said second end of said second bit is configured for engaging and cutting into the plug wherein the plug is structurally compromised to facilitate removal of remnants of the plug from the hydrant pipe, said second end of said second bit being tapered extending from a front face of said second bit and a rear face of said second bit towards said second end of said second bit, said second end of said second bit having a pair of straight outer sections, each outer section extending upwardly and inwardly to an apex between said outer sections; and
   a width of said second end of said second bit being greater than a width of said second end of said first bit.

* * * * *